United States Patent
Chales et al.

[11] Patent Number: 5,098,359
[45] Date of Patent: Mar. 24, 1992

[54] BACKLASH FREE ARTICULATION REDUCING MECHANISM, USABLE NOTABLY FOR THE SETTING OF THE VARIOUS PORTIONS OF AN AUTOMOBILE VEHICLE SEAT

[75] Inventors: Bernard Chales; Jean-Marc Judic, both of Orne, France

[73] Assignee: Etablissments Cousin Freres, Orne, France

[21] Appl. No.: 575,324

[22] Filed: Aug. 30, 1990

[30] Foreign Application Priority Data

Aug. 31, 1989 [FR] France ................ 89 11443

[51] Int. Cl.⁵ .................................... F16H 1/28
[52] U.S. Cl. .................... 475/347; 475/349; 297/362
[58] Field of Search .......... 425/331, 349, 247; 74/409; 297/362

[56] References Cited

U.S. PATENT DOCUMENTS

| | | | |
|---|---|---|---|
| 487,615 | 12/1892 | Frazeur | 475/317 X |
| 1,123,582 | 1/1915 | Patch | 475/347 X |
| 1,586,309 | 5/1926 | Hult | 475/347 X |
| 3,289,488 | 4/1962 | Breuer | 475/347 X |
| 3,673,891 | 7/1972 | Pickles | 475/349 X |
| 4,043,226 | 8/1977 | Buuck | 475/331 X |
| 4,668,013 | 5/1987 | Wahlmann | 475/349 X |
| 4,882,943 | 11/1989 | Pipon et al. | 74/409 |

*Primary Examiner*—Leslie A. Braun
*Assistant Examiner*—Ryan W. Massey
*Attorney, Agent, or Firm*—Robert W. Becker & Associates

[57] ABSTRACT

Backlash free articulation reducing mechanism, usable notably for the setting of the various portions of an automobile vehicle seat, characterized in that each satellite has a central axis with a cylindrical (inner or outer) bearing surface intended for centering itself and reacting on a complementary cylindrical bearing surface (respectively outer or inner) provided on a star-shaped satellite-holder having due to its material and design, a sufficient resiliency for constantly applying the toothings of the satellites in the toothing of their respective flange, thereby allowing taking up clearances inherent to manufacture of this type of mechanism and allowing also absorbing without deterioration any overload able for example to appear during use of the reducing mechanism as an articulation of an automobile vehicle seat.

8 Claims, 6 Drawing Sheets

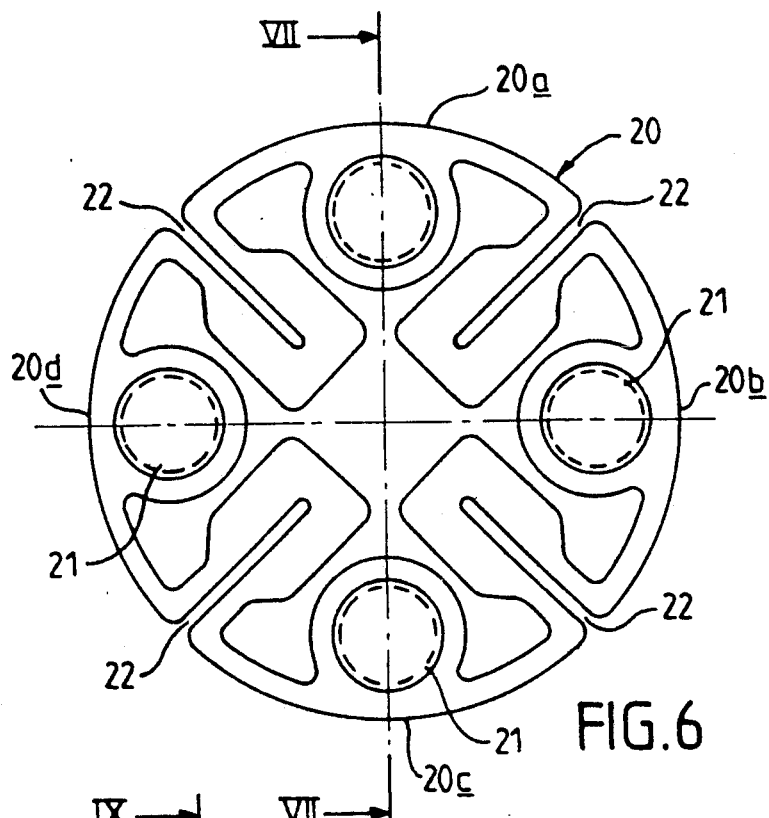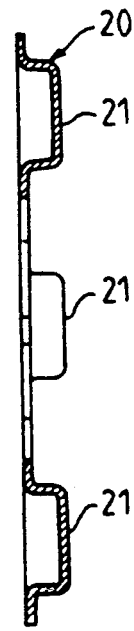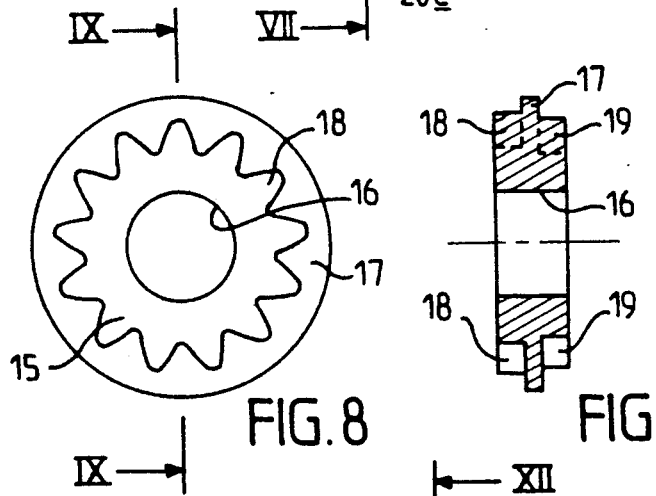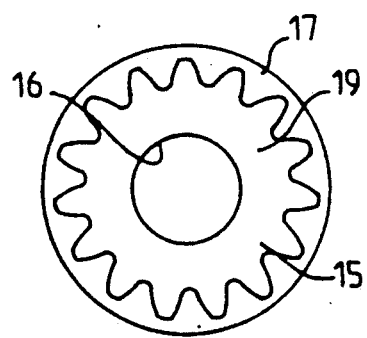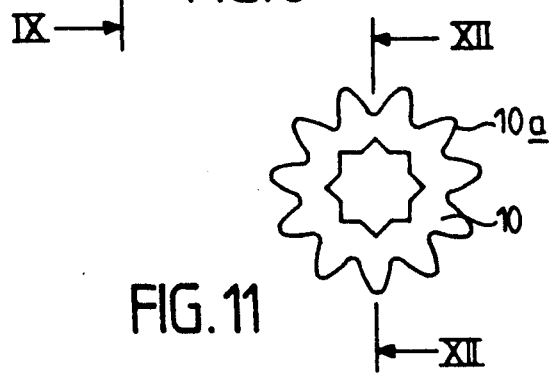

BACKLASH FREE ARTICULATION REDUCING MECHANISM, USABLE NOTABLY FOR THE SETTING OF THE VARIOUS PORTIONS OF AN AUTOMOBILE VEHICLE SEAT

FIELD OF THE INVENTION

This invention relates to a backlash free articulation reducing mechanism, usable notably for the setting of the various portions of an automobile vehicle seat.

DISCLOSURE OF KNOWN PRIOR ART

U.S. Pat. No. 4,882,943 to the Applicant has taught an articulation reducing mechanism, based on the use of two interleaved planetary gear trains, the purpose of which is to avoid, as far as possible, the backlash coming both from manufacturing tolerances and from wear during operation.

This prior art device which is composed of two flanges, so making a casing, one of the flanges being fixed and the other mobile, each of the flanges being with an inner toothing, is fixed by various means, one (the fixed flange) on the armature of the seating portion of the seat and the other (the mobile flange) on the lower portion of the seat back armature.

This casing contains inside four satellites, each including two outer toothings placed on either side of a bearing surface which is cylindrical and coaxial with the toothings.

The first toothing of each satellite is designed so as to mesh simultaneously with the toothing of one of the flanges and with a resilient idle pinion normally placed at the center of the hereabove defined casing.

The second toothing of each satellite is designed so as to mesh with the toothing of the other flange and simultaneously with a control pinion placed in the center and which is self-centered by the toothings of these satellites.

The control pinion is intended for being connected to the driving member provided for effecting the angular setting between the two flanges either by means of a manual control or by means of a motor which can be an electrical, pneumatic or other motor.

Finally, this assembly comprises a resilient satellite-holder member which is only intended for positioning the satellites and blocking the toothings thereof in their respective rings which are interdependent with one of the fixed or mobile flanges.

The embodiment proposed hereabove, although it offers an acceptable solution for the problem arising from backlashes such as defined above, has nevertheless two main disadvantages.

First of all, the satellite-holder, although designed so as to be sufficiently flexible and resilient in order to take up the manufacturing tolerances, is then insufficiently rigid and strong for accepting the large efforts and deformations imposed thereon when heavy loads are applied to the mechanism (such as large torque between the two flanges). The result is a definite deterioration of the backlash take-up system when the mechanism is subjected to heavy duty applications.

On the other hand, upon use, these mechanisms can provide "granulous" feelings to the control member, and even jerks due to the fact that the satellite-holder member applies permanently the toothings of the satellites inside the toothings of the flanges, and therefore renders all the cyclical phenomena caused by the passage of the teeth disagreable and even almost pernicious.

Because of these facts, new studies have been carried out and have shown that it would be possible, by much more simple manufacturing means and more easy mounting means, to solve the hereabove mentioned disadvantages by providing a safe and less costly manufacture providing a result which is much more reliable in all cases.

SUMMARY OF THE INVENTION

According to a first feature of the invention, the backlash free articulation reducing mechanism usable in particular for setting of various portions of an automobile vehicle seat, comprises a fixed flange and a mobile flange, each including an inner circular toothing, the two inner circular toothings, which can be different, but placed on adjacent diameters and define a cabinet containing at least three satellites, each having two outer toothings placed on either side of a cylindrical bearing surface or collar, a first toothing of each satellite meshing with a toothing of one of the fixed and mobile flanges and a second toothing of each satellite meshing with a toothing of an other of the fixed automobile flanges, and with a motive pinion, this motive pinion floating with respect to the fixed and mobile flanges and being fixed on a control shaft, and wherein each satellite has on a central axis with a cylindrical (inner or outer) bearing surface intended for centering itself and reacting on a complementary cylindrical bearing surface (respectively outer or inner) provided on a star-shaped satellite-holder member having a sufficient resiliency for constantly applying the toothings of the satellites inside the toothing of their respective flange, whereby taking up clearances inherent to manufacture of this reducing mechanism and also absorbing, without deterioration, any over load able for example to appear during use of the reducing mechanism as an articulation of an automobile vehicle seat.

According to another feature of the invention, there is placed, in a preferential manner in the cabinet, two star-shaped satellite-holder members, one on each side face of the satellites, whereby obtaining a better distribution of efforts on these satellites.

According to still another feature of the invention, the reducing mechanism is self-protected when subjected to a heavy load, due to the fact that diameter of the collars of the satellites is so calculated that the collars come in contact and react together when the reducing mechanism is subjected to a heavy load, whereby protecting the star-shaped satellite-holders from any strain and noxious deformation and increasing the resistance of the reducing mechanism.

Various other features of the invention will become more apparent from the following detailed description.

BRIEF DESCRIPTION OF THE DRAWINGS

Embodiments of the invention are shown, by way of non limiting examples, in the accompanying drawings, wherein:

FIG. 6 is a plan view of one of the members of the satellite-holder;

FIG. 7 is a cross-sectional view taken along line VII—VII of FIG. 6;

FIG. 8 is a plan view showing one of the sides of a satellite;

FIG. 9 is a cross-sectional view taken along line IX—IX of FIG. 8;

FIG. 10 is a plan view of a satellite, as seen from the side which is opposite to that of FIG. 8;

FIG. 11 is a plan view of a control pinion;

FIG. 12 is a cross-sectional view taken along line XII—XII of FIG. 11;

DISCLOSURE OF PREFERRED EMBODIMENT

Figure 2:
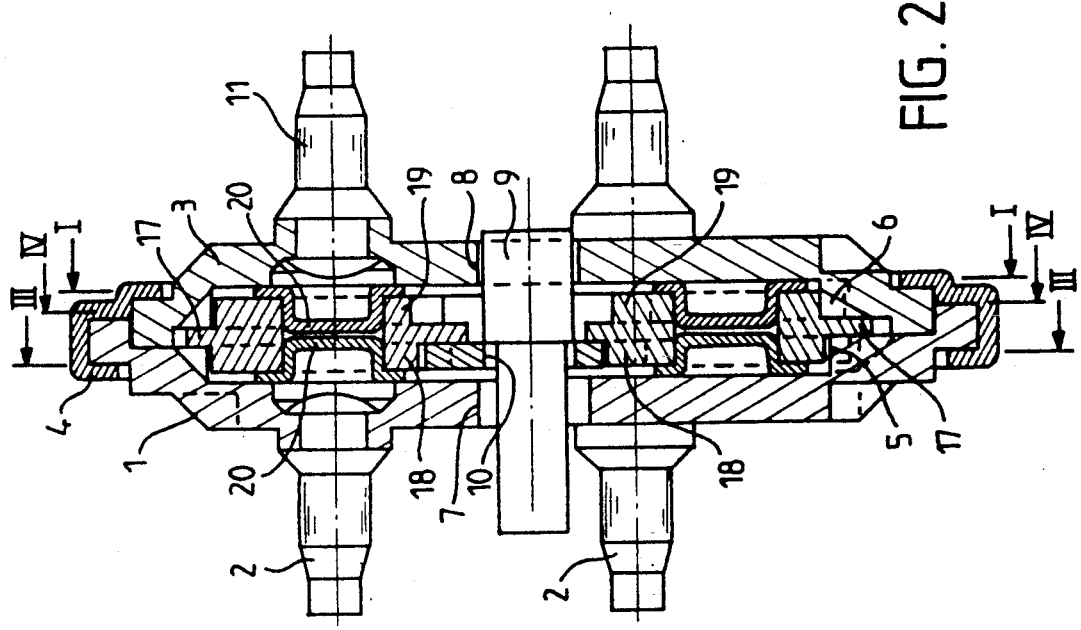
FIG. 2 is a diametrical cross-sectional view of the articulation reducing mechanism, entirely mounted.
Figure 1:
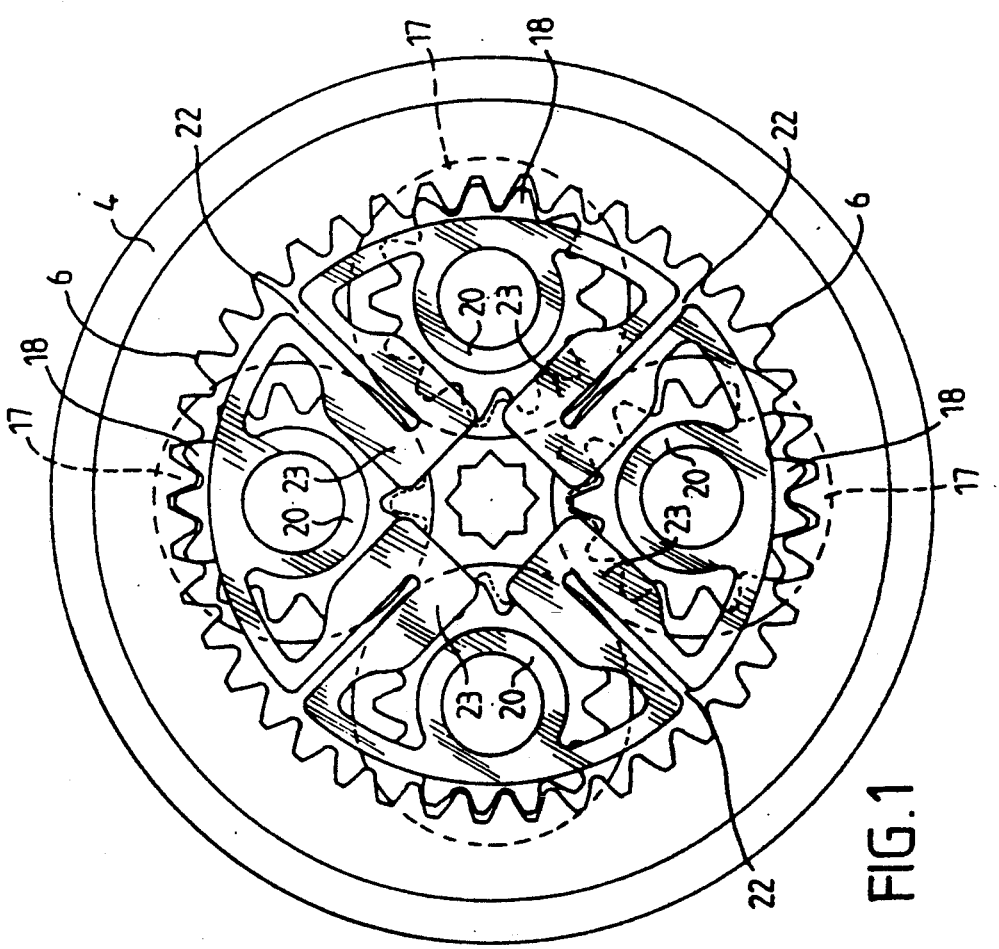
FIG. 1 is a front view of an articulation reducing mechanism, taken on the mobile flange side (see line I—I of FIG. 2)

Referring now to the drawings, FIGS. 1 and 2 show an articulation reducing mechanism which is mainly composed of a fixed flange 1 which can be mounted on an armature of a seat seating portion by various fixation members 2 placed at 120° with respect to one another and including, very often between these fixation members 2, protuberances (not shown) and also placed at 120° with respect to one another and at 60° with respect to the fixation members 2, for a perfect hold of the fixed flange 1 on the seating portion armature. The mobile flange 3 is held on the fixed flange 1 in a manner known per se by a crimped ring 4 so as to permit a rotation of the mobile flange 3 with respect to the fixed flange 1.

The fixed flange 1 includes an inner circular toothing 5, and the mobile flange 3 an inner circular toothing 6.

The above arrangement is usual and does not require extra explanations.

Figure 3:
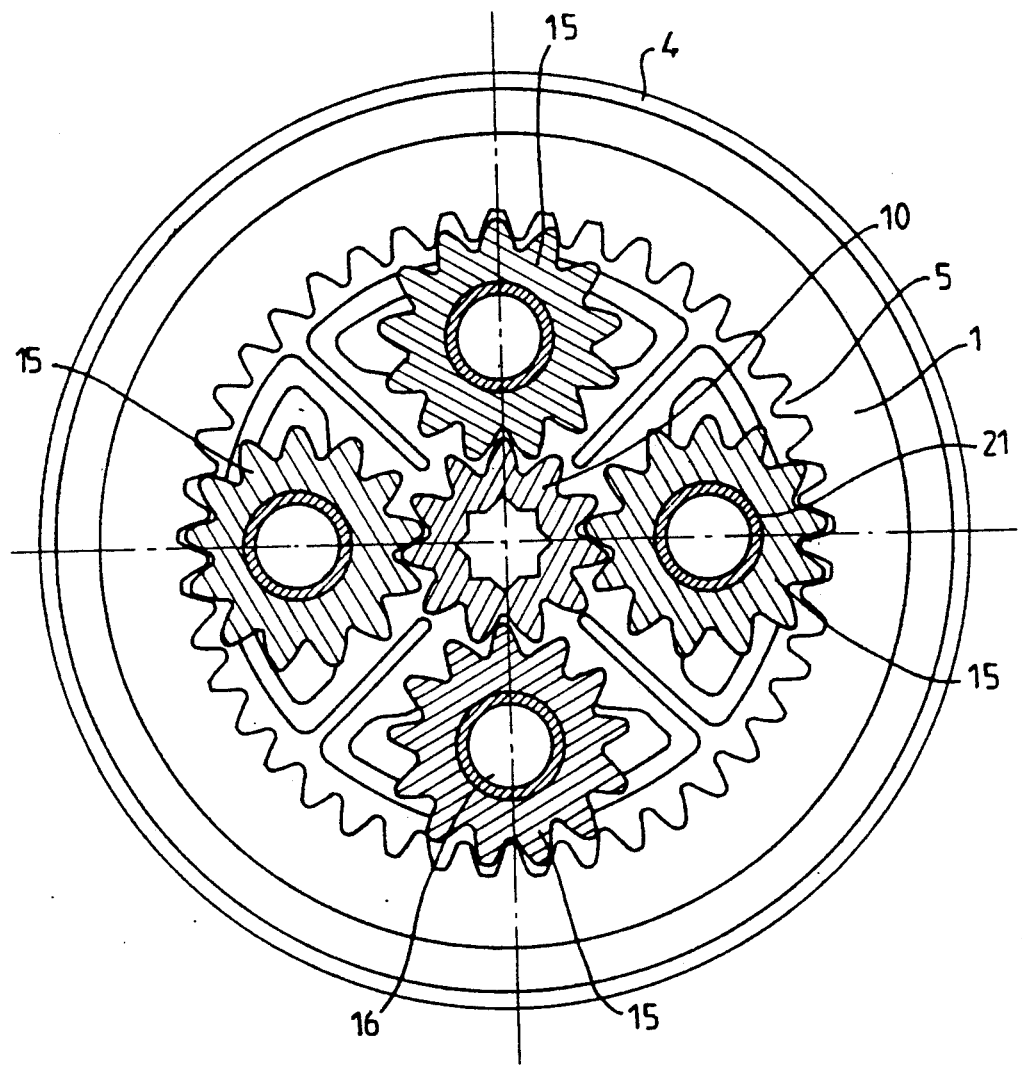
FIG. 3 is a cross-section view taken along line III—III of FIG. 2.

Holes 7, 8 are formed, in the center of the fixed flange 1 and in the center of the mobile flange 3, these holes 7, 8 being provided for passage of a control shaft 9 driving in rotation a motive pinion 10 (see also FIG. 3).

Two remarks should now be made:

a) the control shaft 9 is polygonal in cross-section as better shown in FIG. 3. The control shaft 9 can therefore drive without backlash the motive pinion 10. Of course the above connection could be provided by any other type of arrangement.

b) the control shaft 9 can be extended, on the inner side of the seat, so as to receive for example a motive control of the electrical motor type, as well as the junction with the other articulation placed on an other side of the seat, when the seat is provided with two articulation reducing mechanisms.

It is also possible to provide an extension on the outer side of the control shaft 9 (on the side of the mobile flange 3) so that the control shaft 9, will receive a manual control such as a control knob in a manner also conventionally known.

Finally, the fixation members 11 are mounted on a median circle of the mobile flange 3 so as to connect the mobile flange 3 with the base of the seat back armature in consideration.

In the same way as for the seating portion, centering protuberances or bosses can also be provided between the fixation members 11 placed at 120° with respect to one another.

Of course, the bosses are distributed on the same circle at 60° from the fixation members 11.

Due to the particular shape of the fixed 1 and the mobile 3 flanges, it is clear that when these two elements are mounted one in the other, centering of the mobile flange 3 being effected by the setting in position thereof in a circular undercut 1a of the fixed flange 1, there is thus defined a central free space intended for containing four satellites 15 placed at 90° with respect to one another and made, as shown in FIGS. 8, 9 and 10, of a cylindrical central body 16 having, in its median zone, a cylindrical bearing surface or collar 17 centered with respect to toothings 18, 19.

The four satellites 15 are substantially identical and only their sizes, due to manufacture tolerances can differentiate them.

The motive pinion 10 (see FIGS. 11 and 12) has a toothing 10a intended for cooperating easily with the toothings of the satellites 15.

As already mentioned, the engagement of the motive pinion 10 on the control shaft 9 is here provided via a polygonal opening, which is better shown in FIG. 11. There is hereby provided a better driving grip of the motive pinion 10.

Finally, inside the space defined by the two fixed 1 and mobile 3 flanges are provided two star-shaped satellite-holders 20 made of a strong and sufficiently resilient metal, generally spring steel, of a good grade since used in a thickness which is thin but sufficient for resisting the efforts and impacts required.

As shown in FIG. 6, the satellite-holder 20 is made of four branches 20a, 20b, 20c, 20d, each branch having in its center a protuberance 21 facing the inside of the satellite-holder 20 and intended for being used as a rotation axis for each of the satellite 15. The branches 20a, 20b, 20c, 20d of the star-shaped satellite-holder 20 are separated by deep cut-outs 22 formed in widened portions 23 so as to impart to each star-shaped satellite-holder 20 sufficient flexibility and allow them to store enough resilient energy due to a mounting prestress, and thereby to be able to apply efficiently the satellite toothings in the flange toothing. Thus, these deep cut-outs 22 will provide a certain degree of independence between each of the branches 20a, 20b, 20c, 20d and an acceptance of possible variation of size between the satellites 15 or possible cylindricity faults of the toothings of the flanges 1 and 3.

When the articulation reducing mechanism is mounted as shown in FIGS. 1 and 2, and when one wishes to vary the position of the seat back in consideration with respect to the seating portion, one causes by the hereabove mentioned means the driving of control shaft 9 which drives the pinion 10.

The movement is then transmitted to the double satellites 15 which, in a manner known per se, will cause a rotation of the mobile flange 3 with respect to the fixed flange 1, with a reduction coefficient being determined by the choice of the number of teeth of the various toothings. The effort applied by the satellite-holders 20 on the satellites 15 bears on the central cylindrical zone 16 of these satellites in a continuous manner.

The above arrangement gives to the collars 17 the function of protecting the satellite-holders 20 when the mechanism is subjected to a large torque between the fixed 1 and mobile 3 flanges. This is impossible with the aforementioned prior art mechanism since the outer collars of the satellites are, in that case, directly in relation with the resilient satellite-holder system.

Actually, due to the angle of pressure of the toothings (generally an involute of a circle), when a torque is applied to the mobile flange 3 of the mechanism, there appears on the satellites 15 a radial effort component (toward the center) opposing the pushing effort of the satellite-holder 20. Yet, the satellite-holder 20, because of its function, has to be sufficiently flexible so as to accept the size variation due to the unavoidable manufacturing tolerances, and this effort component was responsible in the previous mechanism for destruction of the satellite-holder system.

Figure 4:
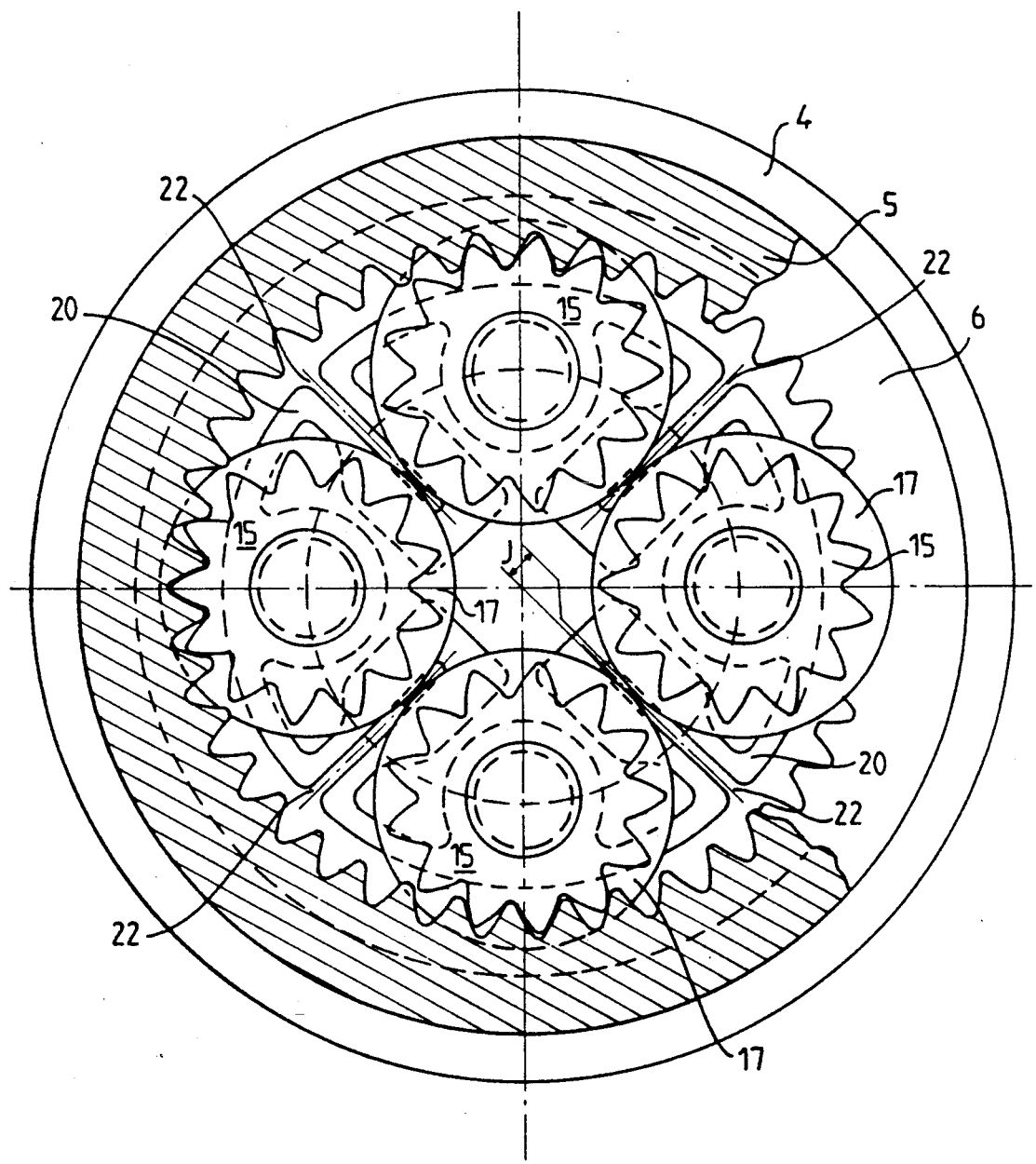
FIG. 4 is a cross-sectional view taken along line IV—IV of FIG. 2, the mobile flange being only partly shown.
Figure 5:
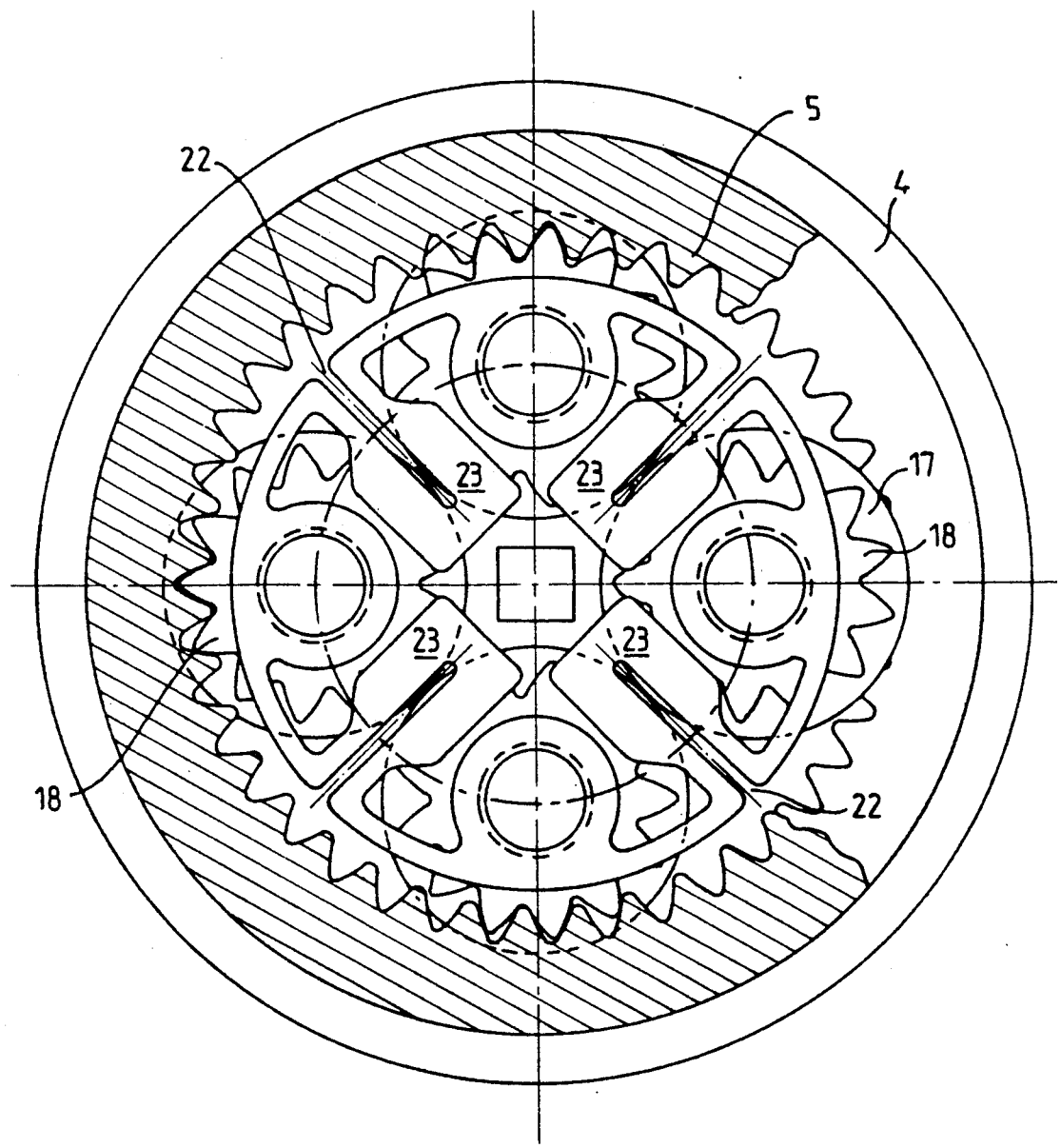
FIG. 5 is a view corresponding to FIG. 4, the second satellite-holder being mounted.

According to the invention and so as not to destroy or deform permanently the satellite-holders 20 when the mechanism is subjected to high loads, the cylindrical bearing surfaces 17, or outer collars, of the satellites have a diameter such that they will react together under heavy loads, and this well before the admissible deformation limits and mechanical stresses of the resilient satellite-holders are reached. This is shown in FIG. 4 where a clearance J is shown between the collars. This clearance is small when the mechanism is not heavily biased and becomes zero when the load applied to the mobile flange 3 becomes large and exceeds a determined value.

Such an arrangement enables increasing considerably the behavior of the satellite-holders which will then preserve their efficiency whatever the stresses imposed to the mechanism, but enables also increasing the global behavior of the mechanism since, by reacting together, the cylindrical bearing surfaces 17, or outer collars, will prevent the toothings of the satellites from being disengaged from the toothings of the flanges. This arrangement enables also limiting the deflection measurable when the torque is large on the mobile flange. This backlash free mechanism is then called "rigid".

It should therefore be noted that, according to the present invention, the satellite-holders 20 are designed to exhibit a sufficient rigidity for taking up backlash under loads corresponding to the required application of the product and have a sufficient flexibility for accepting and compensating the manufacturing tolerances. These satellite-holders 20 can be made for example of flat spring steel and the male cylindrical bearing surfaces can then be provided by swaging.

Figure 13:
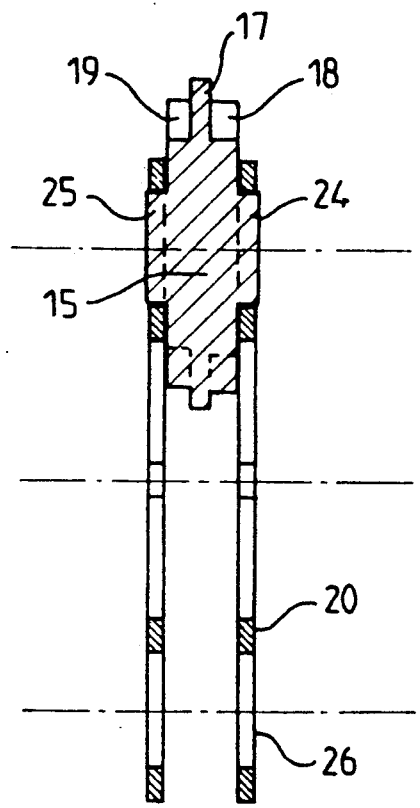
FIG. 13 is a diametrical cross-sectional view of another embodiment of the satellite/satellite-holder connection.

FIG. 13 shows a possible variant for the connection between the satellites 15 and the satellite-holders 20. This alternative embodiment can be interesting for certain manufacturing processes, for example if the satellites 15 are made by extrusion. As shown in FIG. 13, the satellites 15 are not formed with a central hole but have each two male cylindrical bearing surfaces 24 and 25 centered with respect to the toothings and which come in position and react in the cylindrical holes 26 formed in the satellite-holders 20 instead of the previous protuberances 21.

As a conclusion and in order to remedy the cyclical phenomena due to passage of the teeth, the combination of the numbers of teeth of the various toothings is chosen so as to prevent that the various meshings are made in phase and generate disagreable feelings amplified by action of the satellite-holders.

Actually, in order to be sure to have such an arrangement, the number of teeth of the toothings of the flanges have to be such that the largest common divider between the product of the numbers of teeth of flanges 1, 3 and the number of satellites 15 is normally equal to 1 (the unit). In FIGS. 3 and 4 where the choice of the numbers of teeth is shown very clearly, it is clear that in fact the meshing is not made in phase so as to avoid a creation of hard points or jerks. The present invention is, of course, in no way restricted to the specific disclosure of the specification and drawings, but also encompasses any modifications within the scope of the appended claims.

We claim:

1. A backlash free articulation reducing mechanism, comprising:

a fixed flange having a first inner circular toothing;

a mobile flange having a second inner circular toothing that can differ from said first toothing but is placed on an adjacent diameter, with said flanges defining a cabinet that contains at least three satellites, each of which has two outer toothings placed on either side of a cylindrical collar, with one of said satellite toothings meshing with one of said flange toothings, and the other of said satellite toothings meshing with the other of said flange toothings, and with each of said satellites having a central axis with a cylindrical bearing surface for centering and reacting on a complementary cylindrical bearing surface of a star-shaped satellite-holder that has a sufficient resiliency for constantly applying said satellite toothings in their pertaining flange toothings, in the process taking up clearances inherent to manufacture of said reducing mechanism and also absorbing, without deterioration, any overload that occurs; and a motive pinion that is floatingly mounted with respect to said fixed and mobile flanges and is fixed on a control shaft.

2. A mechanism according to claim 1, in which said collars of said satellites have a diameter that is of such a dimension that said collars come into contact and react together when said reducing mechanism is subjected to heavy loads, thereby protecting said satellite-holder from stress and noxious deformation and increasing the resistance of said reducing mechanism by preventing said satellite toothings from disengaging from said flange toothings.

3. A mechanism according to claim 1, in which the largest common divider between a product of a number of teeth of said flanges and a number of said satellites is equal to the unit 1, thereby making it possible to remedy the cyclical phenomena due to passage of said teeth which generate disagreeable feelings, hard points, or jerks amplified by the action of said resilient satellite-holder.

4. A mechanism according to claim 1, in which said satellite-holder comprises several branches, the number of which is equal to the number of said satellites, with each of said branches being provided with a protuberance that faces inside one of said satellites and serves as a rotation axis therefor by being disposed in a cylindrical recess that forms said bearing surface of that satellite, and with said satellite-holder branches being separated by deep cutouts formed in widened portions so as to impact to said satellite-holder a sufficient flexibility for enabling said satellite-holder to store a sufficient resilient energy, due to a mounting prestress, and to thereby efficiently apply said satellite toothing in said flange toothings while ensuring a certain degree of independence between said branches to thus better accept possible variations of size among said satellites and possible cylindricity faults of said flange toothings.

5. A mechanism according to claim 1, in which each of said satellites is disposed under stress inside said flange toothings via two star-shaped satellite-holder members that are disposed in said cabinet, one against each side face of said satellites so as to better distribute efforts thereon.

6. A mechanism according to claim 5, in which each of said star-shaped satellite-holder members is provided by swaging and cutting a flexible resilient material.

7. A mechanism according to claim 6, in which said material is a spring steel.

8. A mechanism according to claim 1, in which each of said satellites is provided with two projecting cylindrical bearing surface means that are centered with respect to said satellite toothings and come into position and react in bearing surfaces in the form of cylindrical holes formed in said satellite-holders.

* * * * *